Sept. 11, 1934.  W. F. SCHULZ  1,973,113
PROCESS OF WELDING
Filed May 26, 1932
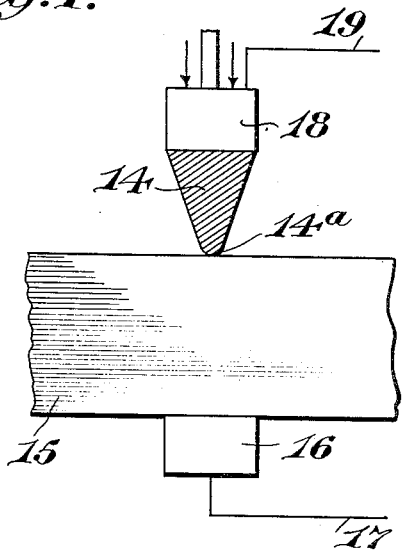
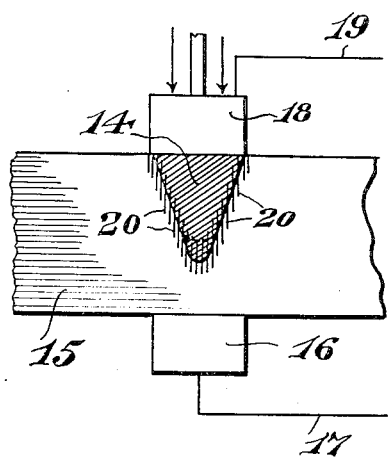
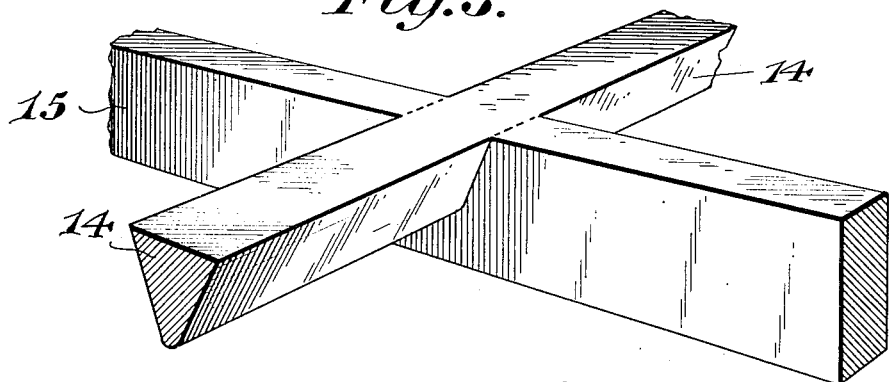
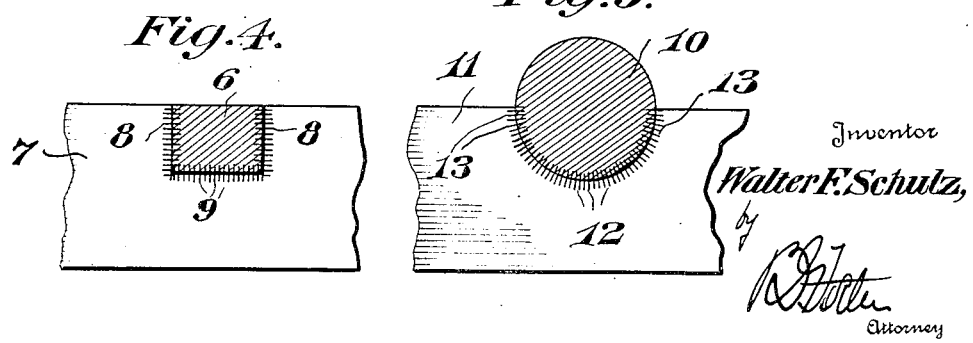
Inventor
Walter F. Schulz,
by
Attorney Patented Sept. 11, 1934

1,973,113

UNITED STATES PATENT OFFICE 1,973,113

PROCESS OF WELDING

Walter F. Schulz, Youngstown, Ohio, assignor to Truscon Steel Company, Youngstown, Ohio, a corporation of Michigan Application May 26, 1932, Serial No. 613,754

2 Claims. (Cl. 219—10)

The present invention relates to a novel process of uniting by electric welding parts that are seated to a substantial extent one within the other, the object being to produce an efficient weld throughout the interrelated portions of the parts so seated.

In the process of electrical resistance pressure welding of metal parts, a suitable electric current of the required voltage and amperage is caused, by means of suitable connection of the means of conducting the electricity, to flow over portions of the parts to be welded from points beyond to and through the proposed point of welding.

The parts are brought together so as to fully complete the electric circuit provided through approximately complete continuity of the metal parts as electric conductors. The lack of absolutely complete continuity where the parts are brought together sets up resistance to the flow of current, which resistance develops heat, which heat will fuse the metals of the parts at the surfaces of most nearly complete contact to the extent of the capacity of the current and referable to the concentration of the current in operative effect upon varying areas of approximate contact, all considered with reference to the physical characteristics of the metals involved. The initial effect of the fusion is to change the structure of the metal in such respects as to weaken its strength of cohesion after cooling if the current is withdrawn without the application of pressure. Pressure applied to the metal while cooling from the fusion temperature to at least below Ac 3 in the critical range, tends to restore such strength. Satisfactorily sufficient composite union of the fused metals to complete the weld occurs only where sufficient pressure is applied and maintained while the metals are cooling from the fusion temperature.

It is well known that current applied to parts as above explained diffuses itself over outer surfaces of the metallic conductor and concentrates for flow between the parts at the points of most approximate contact. Accordingly welding, with the usual current, materials and pressure, will commence and be most effective where small areas of the parts are brought into approximate contact. But, until my discovery herein disclosed, it has not been known to completely embed one part of substantial area wholly within another and still produce a satisfactory weld at all surfaces of the connected parts.

In the drawing:

Figure 1 is a sectional view showing the relation of the parts at the beginning of the welding process.

Figure 2 is a similar view showing the relation of the parts at the end of the welding process.

Figure 3 is a detail perspective view showing the finished product.

Figure 4 is a view outlining the effects secured by welding a rectangular bar into a plate.

Figure 5 is a similar view but showing the result obtained in welding a round bar into a plate.

Referring first to Figure 4, assuming that the lower surface of a square bar 6 is brought into contact with the upper edge of the plate 7 for the purpose of welding the two together and causing the bar 6 to be embedded in the plate 7, if there is initially and thereafter continued sufficient current and pressure for the successive steps, fusion will occur in the top of the plate 7 and the bottom of the bar 6 at their line of contact. As the metals are thus softened and pressure continued, the bar continues to fuse its area into the area of the plate. As the bar becomes further and further embedded in the plate, fusion will occur along adjacent portions, indicated by the horizontal lines at 8, but there will not be sufficient pressure against or between these portions to restore the strength of the fused metal or produce a composite union of approximately the strength of the original metal. The efficient weld occurs only at the bottom 9 or as indicated by the vertical lines, leaving the final structure weakened along the sides 8 of the bar. In the parlance of the art, metal fused but not subjected to sufficient pressure to develop efficient welding strength is called "burnt" metal. Obviously therefore a real welding union between the parts only occurs at the bottom of the bar 6.

Much the same effect will be secured in welding a round bar, as 10, in a plate 11 as shown in Figure 5 when the same process is carried out. That is to say the real welding union, indicated by the vertical lines 12, occurs at the bottom of the bar 10 and gradually weakens on the curvature to the horizontal lines 13 where there is again found "burnt" metal and no adequate welding action. More than that it will be evident that the bar 10 cannot be completely embedded in the plate 11 as the upper portion thereof will have no pressure at all against the material of the bar 11 and indeed no contact therewith.

In Figures 1 and 2 is shown the process of the present invention. In this case a bar 14 of filled V-shape in cross section is press-welded into a plate as 15, the lowermost point 14a that contacts with the upper edge of the plate 15 being preferably slightly rounded, though it may be sharp. Assuming the plate 15 supported on a welding electrode 16 supplied in the usual manner by a conductor 17 from a suitable source of current and a corresponding electrode 18 constituting the other pole of the circuit and having connected thereto a conductor 19, said electrode 18 is placed upon the bar 14, and put under suitable pressure as indicated by the arrows. It will be seen that as the fusion occurs at the point 14a the surplus soft metal is extruded at the sides and sufficient pressure is maintained to force the bar down into the plate to any depth desired, preferably until its upper flat face is flush with the same. Because of the shape of the bar a substantially equal pressure is progressively maintained at all surfaces of adjacency of the parts as indicated by the vertical lines at 20. When the bar has entered the plate to the desired depth, the current is withdrawn but the pressure is continued to complete the weld, and this weld it will be noted, occurs at all the areas of adjacency or contact of the parts.

The entering slopes of the V, i. e. the angle between the said sides thereof, may be somewhat varied as may best serve the purpose for which the entering part (in this case a bar) is designed to be efficient and still produce a sufficiently satisfactory weld. The permissible variation also depends somewhat upon the physical characteristics of the metals used. Accordingly, the form of the entering part in sectional area must be determined to some extent in each case by the practitioner of the method, with reference to the conditions mentioned, by actual test. On account of the possible variations of materials and requirements, no definite formula can be given. But I have found, for instance, by test that with medium grade steel an angle of approximately between 60 and 80 degrees is most satisfactory for average variations referable to average purposes. An angle of 80 degrees will result in greater effective pressure parallel to the line of exertion of pressure and a somewhat more satisfactory weld. But such an angle necessarily reduces the depth and thereby in some respects the effective strength of the entering part. An angle of 70 degrees produces a sufficient pressure and a weld effective for most purposes with a form of sectional area in the entering part, a bar for instance, desirable for most uses. An angle of 60 degrees will produce a good weld but not so good as with the more obtuse angles above mentioned. With an angle of 50 degrees, the weld begins to show unreliability from a commercial standpoint.

I have described my process of welding applied to a union of a bar and a plate. But it will be understood that the principle of my invention may be applied to a like union of other metal structures.

What I claim is:

1. The process of electrical welding, which consists in placing a plate on edge, placing a bar of less depth and of substantially V-shape in cross section against the plate with the apex edge of said V-shaped bar against and across one of the longitudinal edges of the plate, passing a welding current through the bar and plate at their points of intersection, thereby softening the material of the plate that is on edge, applying pressure to the plate and bar, and forcing the V-shaped bar into the longitudinal margin of the plate transversely thereof and continuously exerting outward pressure throughout its depth against the resistance of the longitudinally disposed mass of the plate until the base face of the bar is substantially flush with that edge of the plate initially contacted by the apex edge of said V-shaped bar.

2. The process of electrical welding, which consists in placing a plate on edge, placing against the plate, a bar that is substantially V-shaped in cross section and has its divergent side faces disposed at an angle of between sixty degrees and eighty degrees, said V-shaped bar having its longitudinal apex edge against and across one of the longitudinal edges of the plate, passing a welding current through the bar and plate at their points of intersection, thereby softening the material of the plate that is on edge, applying pressure to the plate and bar, forcing the V-shaped bar into the longitudinal margin of the plate, transversely thereof and continuously exerting outward pressure throughout its depth against the resistance of the longitudinally disposed mass of the plate until the base face of the bar is substantially flush with that edge of the plate initially contacted by the apex edge of said V-shaped bar, cutting off the welding current from the plate and bar, and continuing said pressure against the same after the said current has been cut off.

WALTER F. SCHULZ.